US012769070B2

(12) United States Patent
Ban

(10) Patent No.: US 12,769,070 B2
(45) Date of Patent: Oct. 20, 2026

(54) OPTICAL MODULE

(71) Applicant: CIG Photonics Japan Limited, Kanagawa (JP)

(72) Inventor: Takuma Ban, Komae (JP)

(73) Assignee: CIG PHOTONICS JAPAN LIMITED, Kanagawa (JP)

( * ) Notice: Subject to any disclaimer, the term of this patent is extended or adjusted under 35 U.S.C. 154(b) by 302 days.

(21) Appl. No.: 18/641,490

(22) Filed: Apr. 22, 2024

(65) Prior Publication Data

US 2024/0402444 A1 Dec. 5, 2024

(30) Foreign Application Priority Data

May 31, 2023 (JP) ................................. 2023-089947

(51) Int. Cl.
*G02B 6/42* (2006.01)

(52) U.S. Cl.
CPC ......... *G02B 6/4239* (2013.01); *G02B 6/4243* (2013.01); *G02B 6/426* (2013.01); *G02B 6/428* (2013.01)

(58) Field of Classification Search
CPC ...... G02B 6/426; G02B 6/4239; G02B 6/428; G02B 6/4243; G02B 6/424
See application file for complete search history.

(56) References Cited

U.S. PATENT DOCUMENTS 9,002,161 B2 * 4/2015 Kasahara ............ G02B 6/4265 385/33
2013/0170791 A1 7/2013 Kasahara et al.

FOREIGN PATENT DOCUMENTS

JP 2007-163604 A 6/2007
JP 2012-058409 A 3/2012
JP 2016-206308 A 12/2016
JP 2016-218280 A 12/2016
JP 2022-181482 A 12/2022

* cited by examiner

*Primary Examiner* — Michael P Mooney
(74) *Attorney, Agent, or Firm* — MATTINGLY & MALUR, PC

(57) ABSTRACT

An optical module includes: a block; a waveguide substrate including a side face, a top part of the front face of the block protruding upward from the side face, the optical fiber and the optical waveguide aligning on a coinciding optical axis; a base substrate including a top face and a sticking-out part protruding under the block from the waveguide substrate; and an adhesive bonding the block to the waveguide substrate and the base substrate. The adhesive includes a top segment located at a corner section delineated by the top part of the front face of the block and a top face of the waveguide substrate, a middle segment interposed between the front face of the block and the side face of the waveguide substrate, and a bottom segment interposed between the bottom face of the block and a top face of the base substrate.

26 Claims, 23 Drawing Sheets

OPTICAL MODULE

CROSS-REFERENCE TO RELATED APPLICATION

The present application claims priority from Japanese patent application JP2023-089947 filed on May 31, 2023, the contents of which are hereby incorporated by reference into this application.

BACKGROUND

1. Field

The present disclosure relates to an optical module.

2. Description of the Related Art

An optical module requires optical axis matching of an optical fiber and an optical waveguide. A fiber block is fixed at a tip of the optical fiber (JP 2007-163604 A, JP 2016-206308 A). The optical waveguide is mounted on a waveguide substrate, and the fiber block and the waveguide substrate are fixed (JP 2012-58409 A). An adhesive is used for the fixation of both (JP 2016-218280 A).

The adhesive is interposed between the fiber block and the waveguide substrate, and it also bulges on the waveguide substrate. Expansion of the bulged portion due to heat tilts the fiber block, causing the optical axes of the optical fiber and the optical waveguide to misalign, resulting in a degradation of transmission characteristics.

SUMMARY

The present disclosure aims at preventing degradation of transmission characteristics.

An optical module includes: a block attached to an end part of an optical fiber, the block including a front face from which a tip face of the optical fiber is exposed; a waveguide substrate in which an optical waveguide is embedded, the waveguide substrate including a side face from which a tip face of the optical waveguide is exposed, the side face facing the front face of the block, a top part of the front face protruding upward from the side face, the optical fiber and the optical waveguide aligning on a coinciding optical axis; a base substrate including a top face to which a bottom face of the waveguide substrate is fixed, the base substrate including a sticking-out part protruding under the block from the waveguide substrate, the top face facing the bottom face of the block; and an adhesive bonding the block to the waveguide substrate and the base substrate. The adhesive includes a top segment located at a corner section delineated by the top part of the front face of the block and a top face of the waveguide substrate, a middle segment interposed between the front face of the block and the side face of the waveguide substrate, and a bottom segment interposed between the bottom face of the block and a top face of the base substrate.

DETAILED DESCRIPTION

Figure 1:
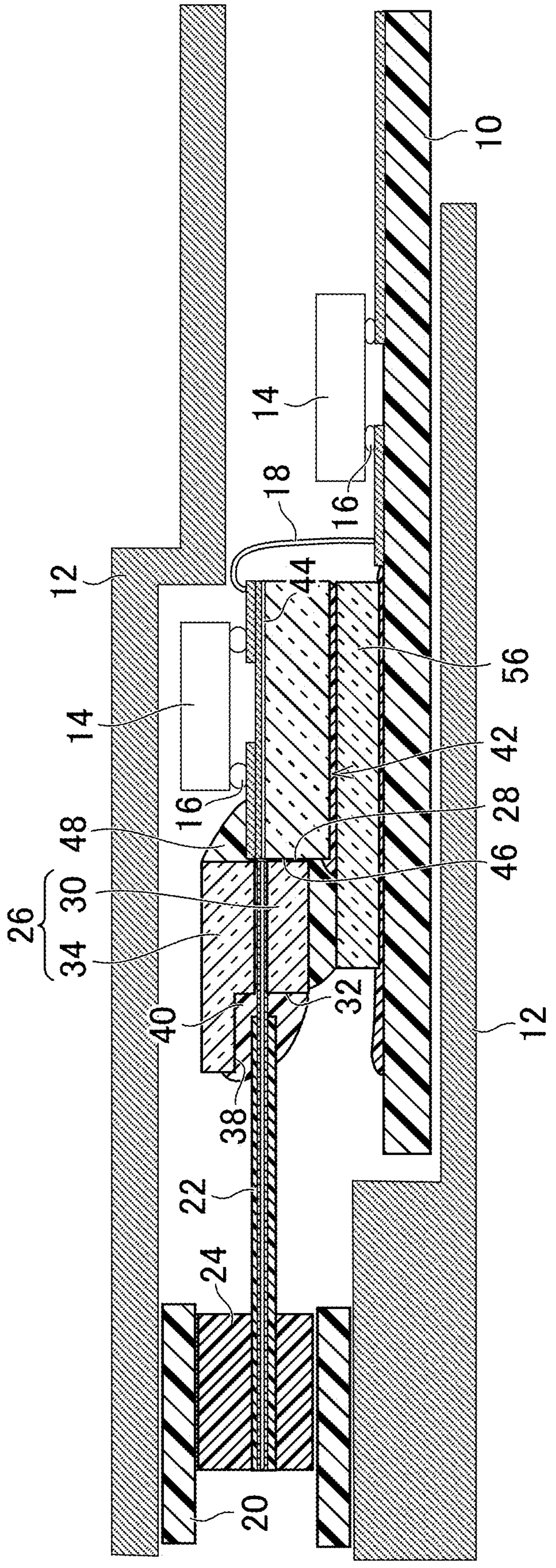
FIG. 1 is an overall cross-sectional view of an optical module according to a first embodiment.

Hereinafter, specific embodiments will be described in detail with reference to the drawings. In all the drawings, elements labeled with the same reference numerals have identical or similar features, and redundant descriptions will be omitted. The sizes in the figures may not always correspond to scale.

First Embodiment

FIG. 1 is an overall cross-sectional view of an optical module according to a first embodiment. The optical module is an optical transceiver. The optical transceiver is used in optical communication devices such as routers or switches, serving as signal input and output ports for the devices. An unillustrated connector, mounted on a printed circuit board 10, is used for electrical input and output. Inside a case 12, there is an electronic component 14 (e.g., integrated circuit chip), and a solder 16 is used for an electrical and physical connection. A wire 18 is used for an electrical connection between a transmission line and another transmission line.

An adapter 20 is attached to the case 12, and a ferrule 24, which is fixed at an end part of the optical fiber 22, is inserted into the adapter 20. By inserting a ferrule of an external optical fiber, not shown, into the adapter 20, an optical input and output is achieved. A multi-fiber push on (MPO) connector is used as an optical interface.

Figure 2:
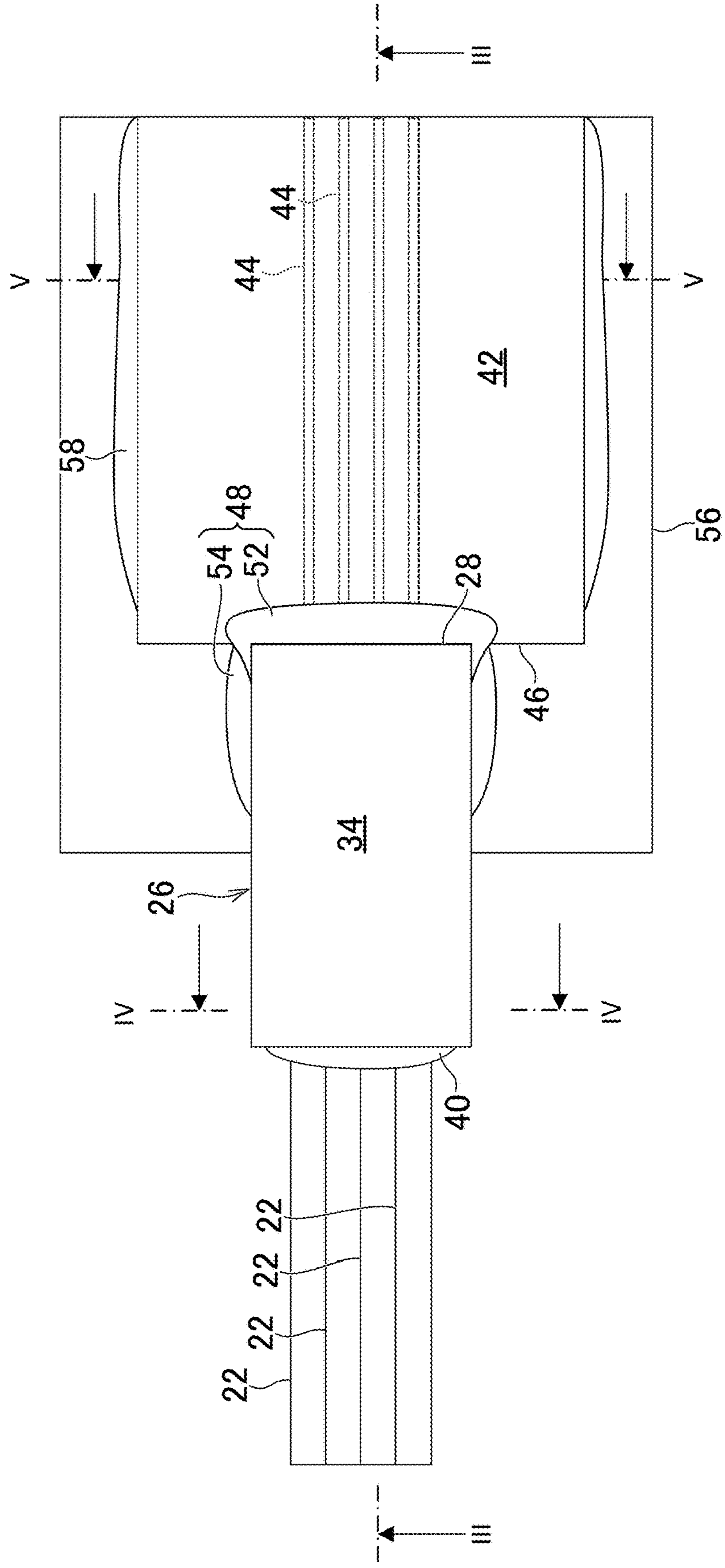
FIG. 2 is a partial plan view of an internal structure of the optical module in FIG. 1.
Figure 3:
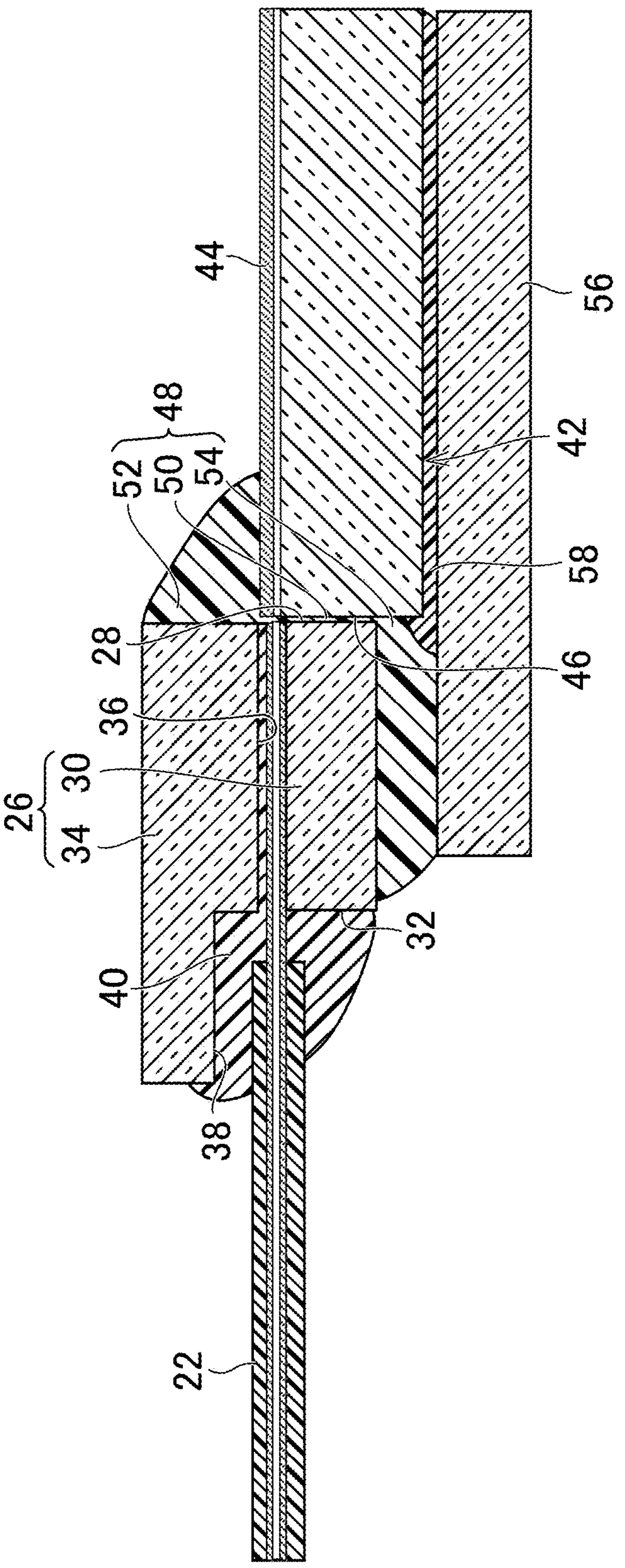
FIG. 3 is a cross-sectional view along line III-III of the internal structure in FIG. 2.

FIG. 2 is a partial plan view of an internal structure of the optical module in FIG. 1. FIG. 3 is a cross-sectional view along line III-III of the internal structure in FIG. 2.

The optical fiber 22 includes a core, a cladding, and a coating. The cladding has a lower refractive index than the core. At the end part of the optical fiber 22, the coating is removed, leaving the core and the cladding. A block 26 is attached to the end part of the optical fiber 22. One block 26 is attached to end parts of optical fibers 22. Tip faces of the optical fibers 22 are exposed from a front face 28 of the block 26.

Figure 4:
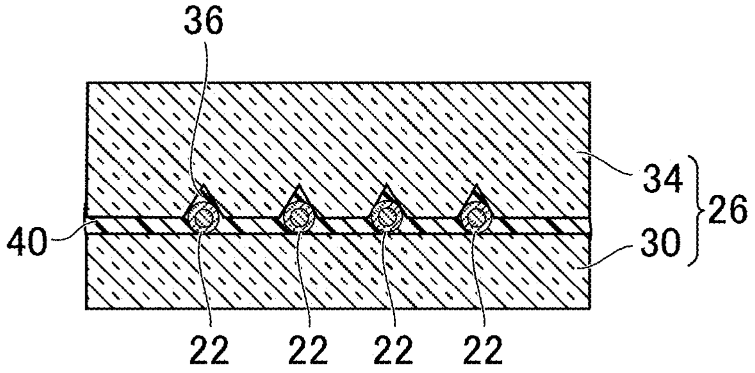
FIG. 4 is a cross-sectional view along line IV-IV of a block and an optical fiber in FIG. 1.

FIG. 4 is a cross-sectional view along line IV-IV of the block 26 and the optical fiber 22 in FIG. 1. The block 26 includes a lower substrate 30. The lower substrate 30 includes a rear end face 32 opposite to the front face 28. The block 26 includes an upper substrate 34 above the lower substrate 30. The optical fibers 22 are sandwiched between the lower substrate 30 and the upper substrate 34. The lower substrate 30 is often thinner than the upper substrate 34. The upper substrate 34 includes V-grooves 36 on a surface facing the lower substrate 30. The optical fibers 22 are placed in the respective V-grooves 36.

As shown in FIG. 3, the upper substrate 34 includes a sticking-out undersurface 38 that protrudes from the lower substrate 30. The lower substrate 30 is shorter, in length from the front face 28 of the block 26, than the upper substrate 34. The upper substrate 34 and the lower substrate 30 are bonded together with a bonding material 40. Part of the bonding material 40 is located at a corner section delineated by the sticking-out undersurface 38 of the upper substrate 34 and the rear end face 32 of the lower substrate 30.

The optical module includes a waveguide substrate 42. On the waveguide substrate 42, as shown in FIG. 1, an electrical transmission line is often formed, and the electronic component 14 is mounted on it. An unillustrated photonic component, such as a photodiode or an optical modulator, can also be embedded in the waveguide substrate 42, performing conversion from one of an electrical signal and an optical signal to another.

Figure 5:
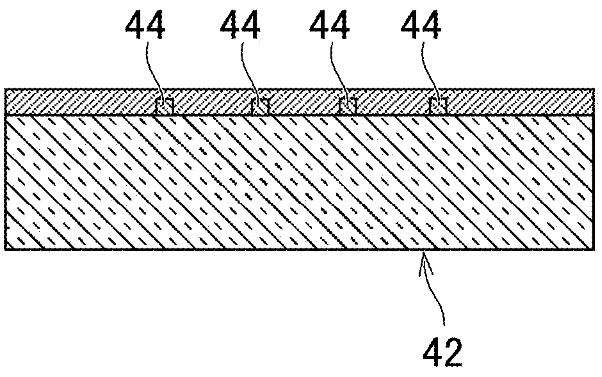
FIG. 5 is a cross-sectional view along line V-V of a waveguide substrate in FIG. 1.

FIG. 5 is a cross-sectional view along line V-V of the waveguide substrate 42 in FIG. 1. An optical waveguide 44 is embedded in the waveguide substrate 42. The optical waveguide 44 is comprised of a core and a cladding. The cladding has a thickness of at most a few tens of micrometers. The core typically has a width or a thickness of a few micrometers for single-mode propagation.

A tip face of the optical waveguide 44 is exposed from a side face 46 of the waveguide substrate 42. The side face 46 of the waveguide substrate 42 and the front face 28 of the block 26 face each other. The optical fiber 22 and the optical waveguide 44 align on a coinciding optical axis. The top part of the front face 28 of the block 26 protrudes upwards from the side face 46 of the waveguide substrate 42. The block 26 is bonded to the waveguide substrate 42 with an adhesive 48. A middle segment 50 of the adhesive 48 is interposed between the front face 28 of the block 26 and the side face 46 of the waveguide substrate 42. A top segment 52 of the adhesive 48 is located at a corner section delineated by the top part of the front face 28 of the block 26 and the top face of the waveguide substrate 42.

As shown in FIG. 3, the optical module includes a base substrate 56. The base substrate 56 is bonded to the printed circuit board 10 (FIG. 1). The bottom face of the waveguide substrate 42 is fixed to the top face of the base substrate 56. An adhesive layer interposed between the waveguide substrate 42 and the base substrate 56. The base substrate 56 includes a sticking-out part that protrudes under the block 26 from the waveguide substrate 42. The top face of the base substrate 56 faces the bottom face of the block 26. The base substrate 56 is of a length that prevent overlap with the bonding material 40.

A gap between the bottom face of the block 26 and the top face of the base substrate 56 is larger than a gap between the bottom face of the waveguide substrate 42 and the top face of the base substrate 56. In other words, a bottom segment 54 of the adhesive 48 is thicker than the adhesive layer 58. The bottom face of the block 26 is positioned higher than the bottom face of the waveguide substrate 42. The top face of the base substrate 56 is flat under the block 26 and the waveguide substrate 42.

The block 26 is bonded to the base substrate 56 with the adhesive 48. The lower substrate 30 is bonded to the base substrate 56. The bottom segment 54 of the adhesive 48 is interposed between the bottom face of the block 26 and the top face of the base substrate 56. The adhesive 48 is greater in thermal expansion coefficient than the base substrate 56.

Figure 6A:
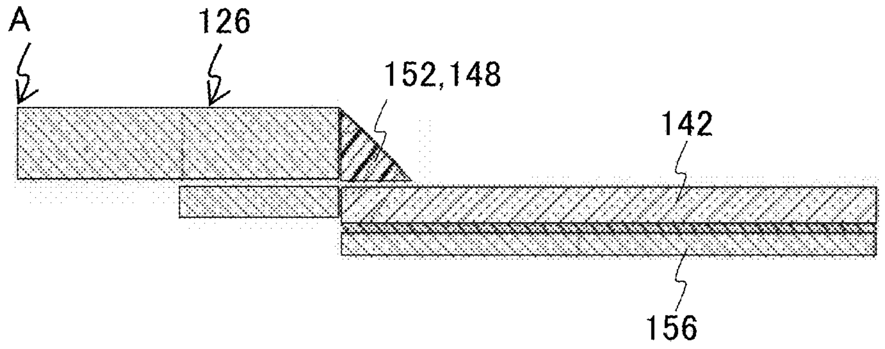
FIG.6A RELATED ART
FIG. 6A is a cross-sectional view of a simulation model that has calculated thermal stress of a conventional block and a conventional waveguide substrate.
Figure 6B:
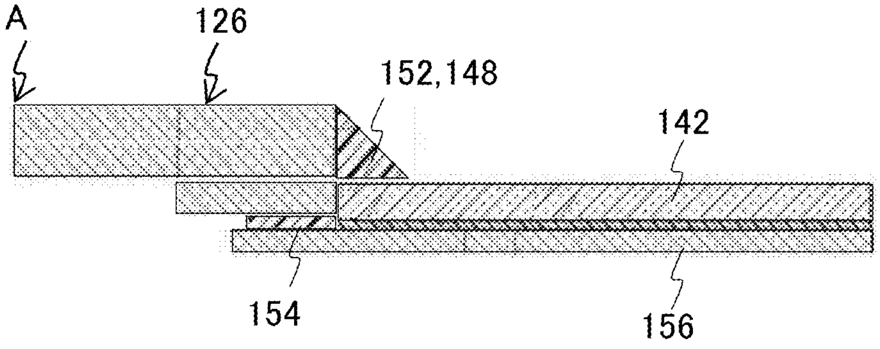
FIG. 6B is a cross-sectional view of a simulation model that has calculated thermal stress of a block and a waveguide substrate of the present embodiment.
Figure 6C:
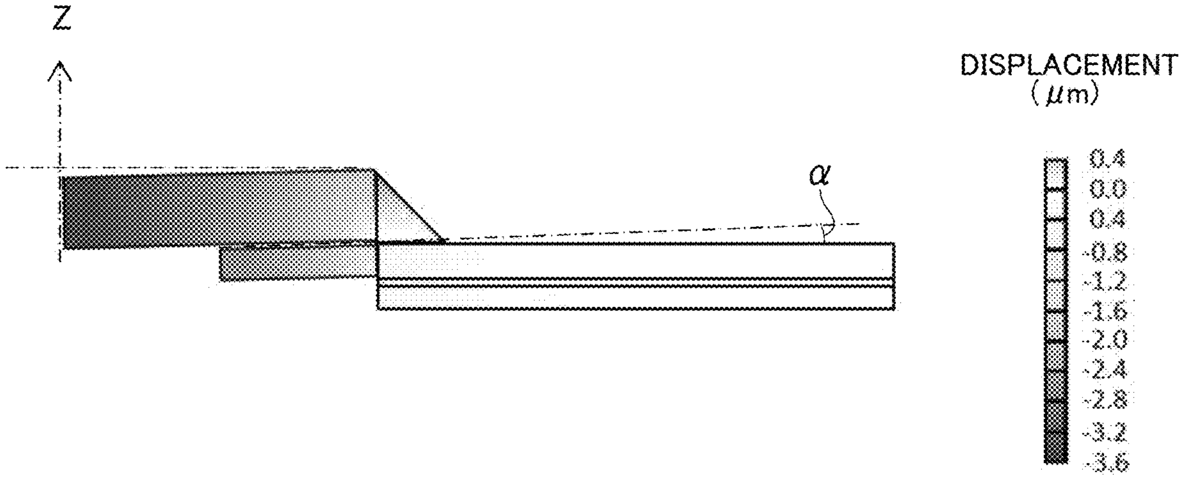
FIG.6C RELATED ART
FIG. 6C is a result diagram of a simulation that has calculated thermal stress of a conventional block and a conventional waveguide substrate.
Figure 6D:
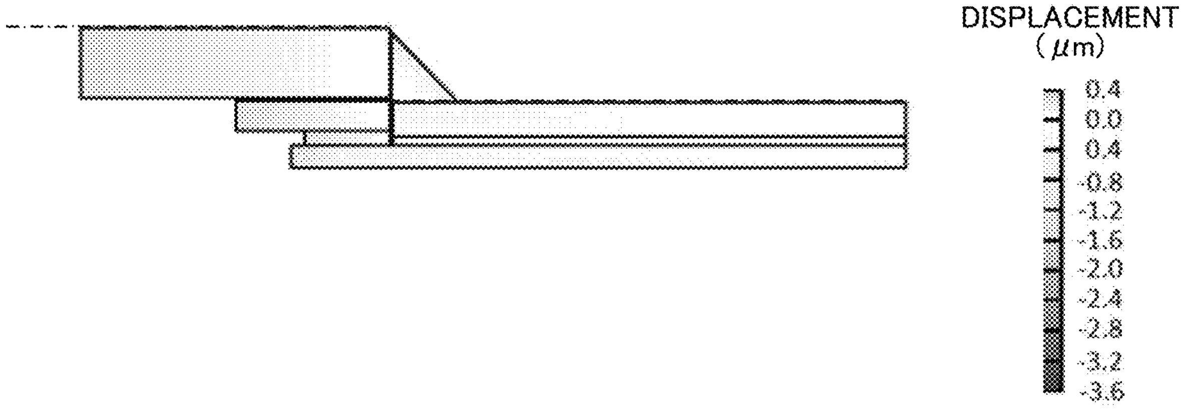
FIG. 6D is a result diagram of a simulation that has calculated thermal stress of a block and a waveguide substrate of the present embodiment.

FIG. 6A is a cross-sectional view of a simulation model that has calculated thermal stress of a conventional block and a conventional waveguide substrate. FIG. 6B is a cross-sectional view of a simulation model that has calculated thermal stress of the block and the waveguide substrate of the present embodiment. FIG. 6C is a result diagram of a simulation that has calculated thermal stress of the conventional block and the conventional waveguide substrate. FIG. 6D is a result diagram of a simulation that has calculated thermal stress of the block and the waveguide substrate of the present embodiment.

The waveguide substrate 142 is made of silicon, the block 126 is made of quartz, and the base substrate 156 is made of cobalt. These materials have a low thermal expansion rate, below $6\times10^{-6}$/K. On the other hand, the adhesive 148, an organic material, has a high thermal expansion rate, over $2\times10^{-5}$/K. When the ambient temperature changes from 25 degrees Celsius to 85 degrees Celsius, in the case of the conventional structure, as shown in FIG. 6C, the block 126 tilts relative to the waveguide substrate 142 due to the thermal expansion of the top segment 152 of the adhesive 148. As a result, the optical axes of the optical fiber and the optical waveguide are misaligned.

In contrast, in the present embodiment, an expansion pressure of the top segment 152 of the adhesive 148 is pushed back by an expansion pressure of the bottom segment 154. As a result, as shown in FIG. 6D, an angle displacement a between the block 126 and the waveguide substrate 142 is suppressed to about 1/18 of the conventional example, and fluctuations in the optical coupling efficiency are also small. Thus, optical coupling stabilizes. The thermal stress simulation results for both the conventional example and the present embodiment are compared below, specifically highlighting the Z-axis displacement at point A and the angular displacement α of the block in relation to the optical waveguide substrate.

Z-axis Displacement at Point A
- Conventional Example: −3.6 micrometers
- Present Embodiment: 0.2 micrometers
- Suppression Rate: 1/18

Angular Displacement
- Conventional Example: −0.0688 degrees
- Present Embodiment: 0.0038 degrees
- Suppression Rate: 1/18

Figure 7:
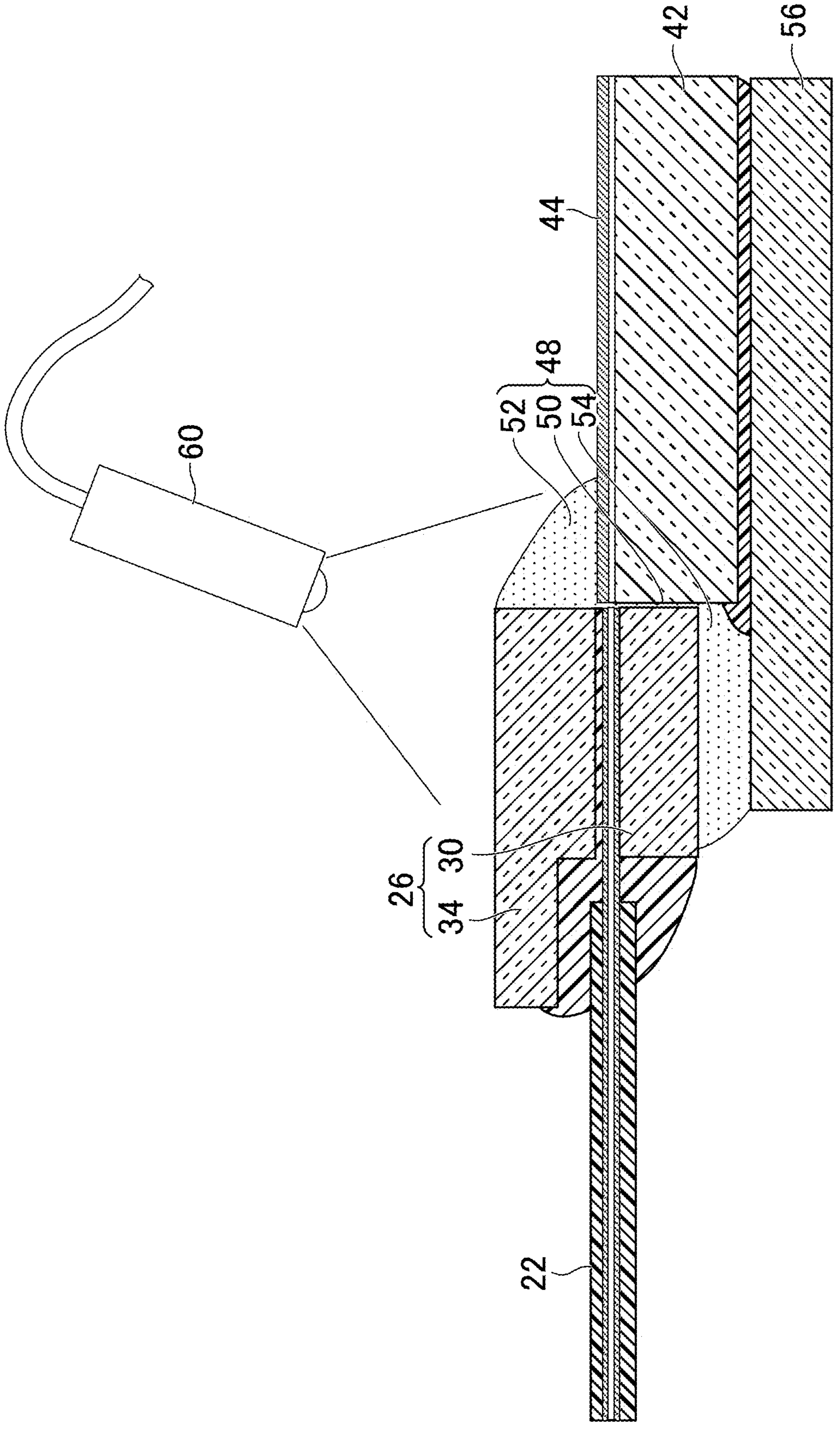
FIG. 7 is an explanatory diagram of a manufacturing process of the optical module.

FIG. 7 is an explanatory diagram of a manufacturing process of the optical module. The block 26 is fixed to the optical fiber 22, and the waveguide substrate 42 is fixed to the base substrate 56. Then, the alignment of the optical fiber 22 and the optical waveguide 44 is performed. The alignment is positioning that involves monitoring optical output, thereby making optical coupling. After that, the block 26 is bonded to the waveguide substrate 42 and the base substrate 56. The adhesive 48 is a light-curable adhesive and is cured by irradiating ultraviolet light from an ultraviolet light 60. If the block 26 is made of a light-transmitting material, it is easy to irradiate the ultraviolet light.

First Variant of First Embodiment

Figure 8:
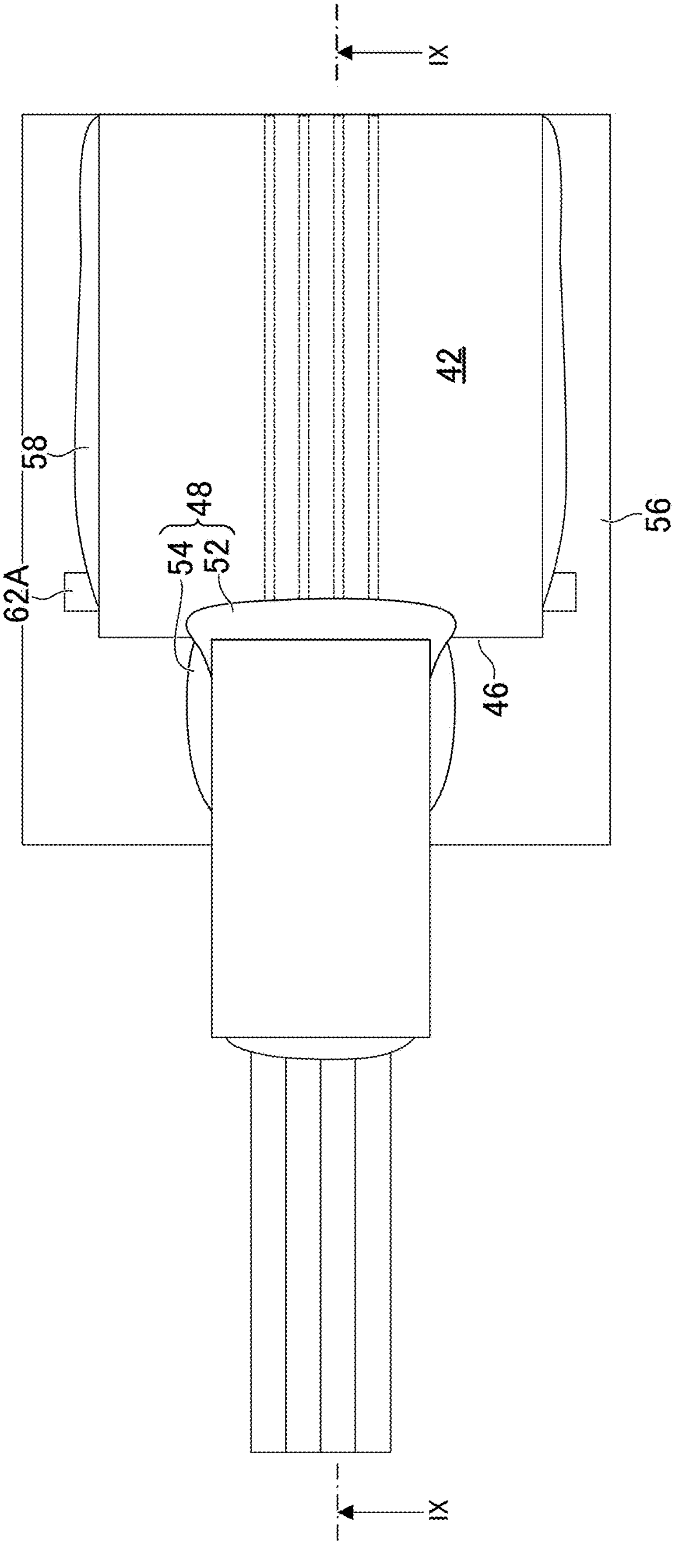
FIG. 8 is a partial plan view of an internal structure of an optical module according to a first variant of the first embodiment.
Figure 9:
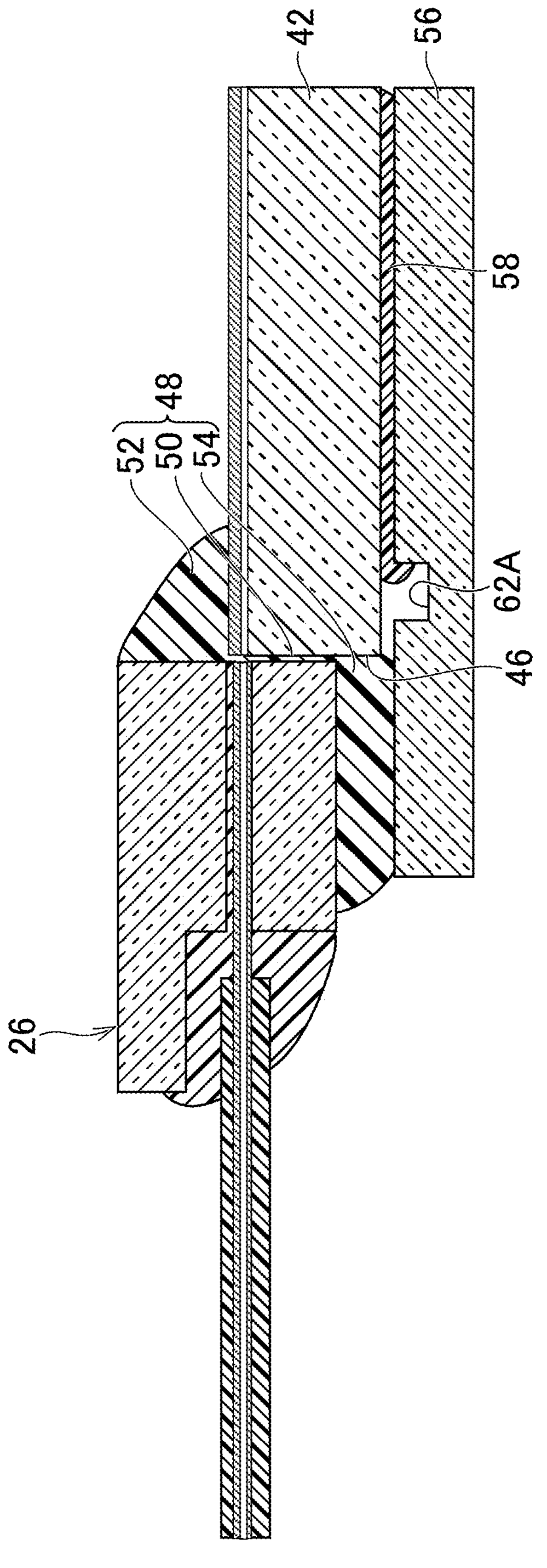
FIG. 9 is a cross-sectional view along line IX-IX of the internal structure in FIG. 8.

FIG. 8 is a partial plan view of an internal structure of an optical module according to a first variant of the first embodiment. FIG. 9 is a cross-sectional view along line IX-IX of the internal structure in FIG. 8. The top face of the base substrate 56 includes a groove 62A. The groove 62A extends along a bottom edge of the side face 46 of the waveguide substrate 42. The groove 62A faces the bottom face of the waveguide substrate 42. The adhesive layer 58 is interposed between the waveguide substrate 42 and the base substrate 56. The end part of the adhesive layer 58 is located inside the groove 62A. This prevents the adhesive 48 from coming into contact with the adhesive layer 58, avoiding adverse effects of contact between both. Also, it prevents overflow of the adhesive layer 58 toward the block 26 from the side face 46, preventing adverse effects that occur during a process of attaching the block 26 to the waveguide substrate 42.

Second Variant of First Embodiment

Figure 10:
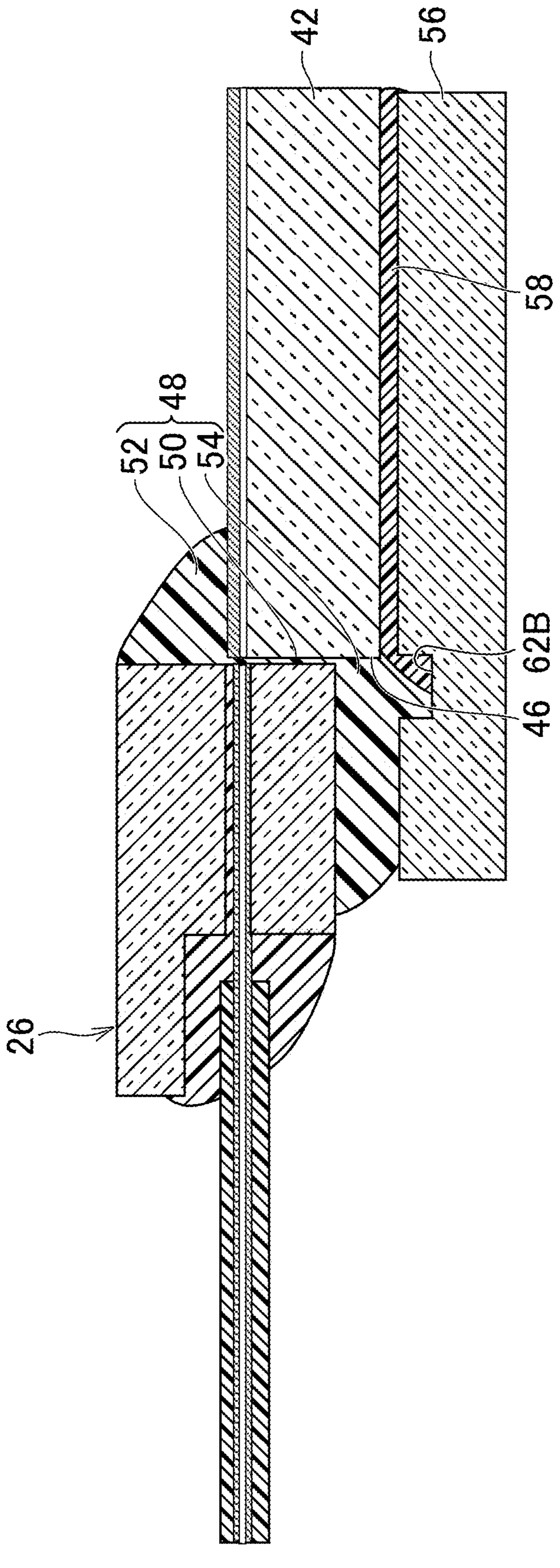
FIG. 10 is a partial cross-sectional view of an internal structure of an optical module according to a second variant of the first embodiment.

FIG. 10 is a partial cross-sectional view of an internal structure of an optical module according to a second variant of the first embodiment. The top face of the base substrate 56 includes a groove 62B. The groove 62B extends along the bottom edge of the side face 46 of the waveguide substrate 42. The groove 62B faces the bottom face of the block 26. The adhesive layer 58 is interposed between the waveguide substrate 42 and the base substrate 56. The end part of the adhesive layer 58 is located inside the groove 62B. This prevents assembly issues that can occur during processes like bonding the block 26 to the waveguide substrate 42, where the adhesive layer 58 may protrude towards the block 26 from the side face 46 and bulge in the height direction. This can be applied when there is no issue with the adhesive 48 coming into contact with the adhesive layer 58.

Third Variant of First Embodiment

Figure 11:
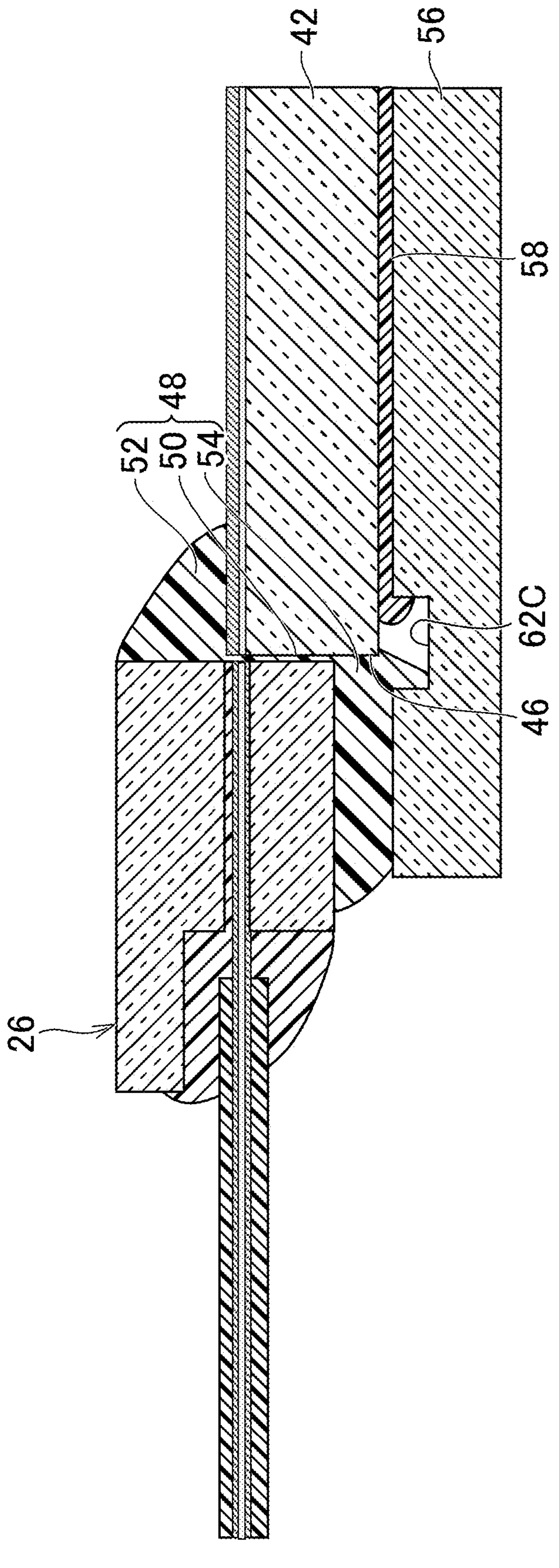
FIG. 11 is a partial cross-sectional view of an internal structure of an optical module according to a third variant of the first embodiment.

FIG. 11 is a partial cross-sectional view of an internal structure of an optical module according to a third variant of the first embodiment. The top face of the base substrate 56 includes a groove 62C. The groove 62C extends along the bottom edge of the side face 46 of the waveguide substrate 42. The groove 62C is directly under the side face 46 of the waveguide substrate 42. The adhesive layer 58 is interposed between the waveguide substrate 42 and the base substrate 56. The end part of the adhesive layer 58 is located inside the groove 62C. This prevents the adhesive 48 from coming into contact with the adhesive layer 58, avoiding adverse effects such as material mixing and preventing the aforementioned assembly problems.

Second Embodiment

Figure 12:
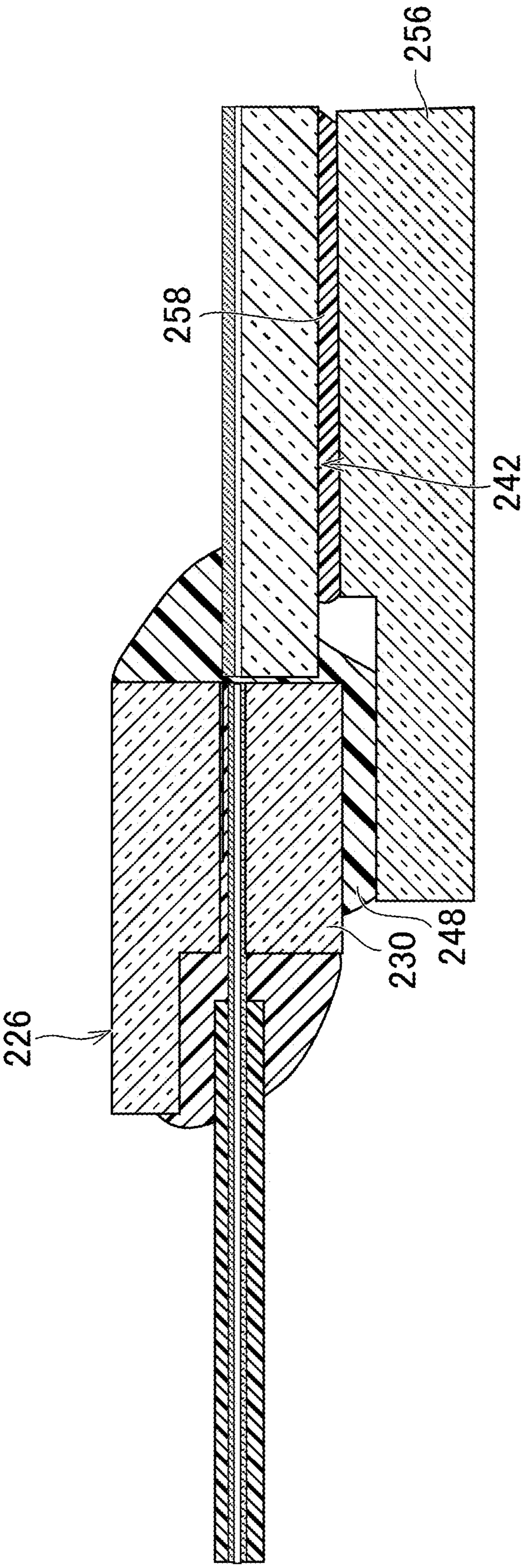
FIG. 12 is a partial cross-sectional view of an internal structure of an optical module according to a second embodiment.

FIG. 12 is a partial cross-sectional view of an internal structure of an optical module according to a second embodiment. The bottom face of the block 226 is at a lower position than the bottom face of the waveguide substrate 242. However, the top face of the base substrate 256 is lower under the bottom of the block 226 than under the waveguide substrate 242. This allows for a space to be created between the bottom face of block 226 and the top face of base substrate 256, where the adhesive 248 can be placed. The space can be ensured even if the waveguide substrate 242 is thin and the bottom substrate 230 of the block 226 is thick. On the top face of the base substrate 256, the bottom face of the adhesive layer 258 is halted at a boundary of a height difference. This prevents the adhesive layer 258 and the adhesive 248 from coming into contact. For other details, the contents of the first embodiment are applicable.

Third Embodiment

Figure 13:
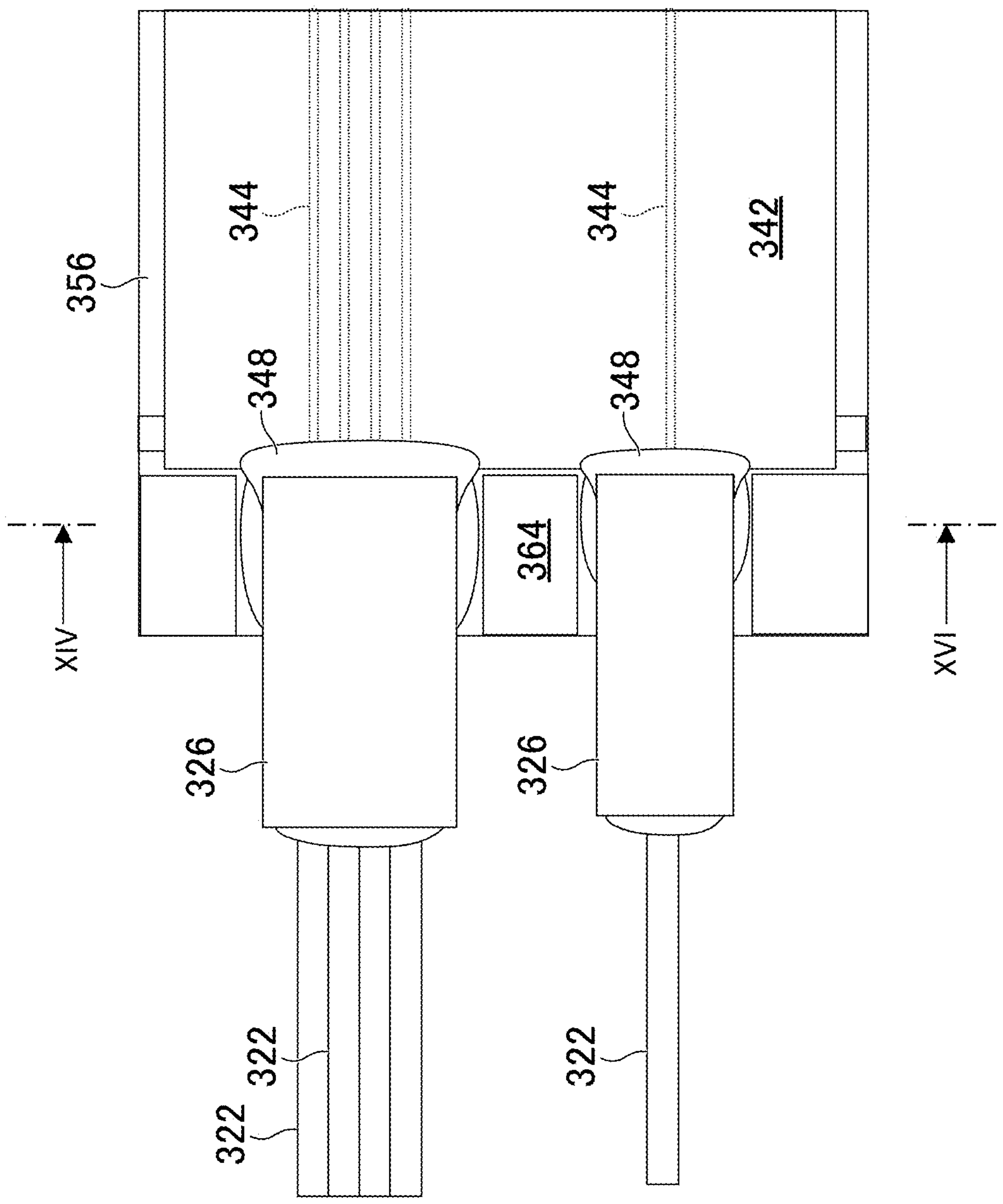
FIG. 13 is a partial plan view of an internal structure of an optical module according to a third embodiment.
Figure 14:
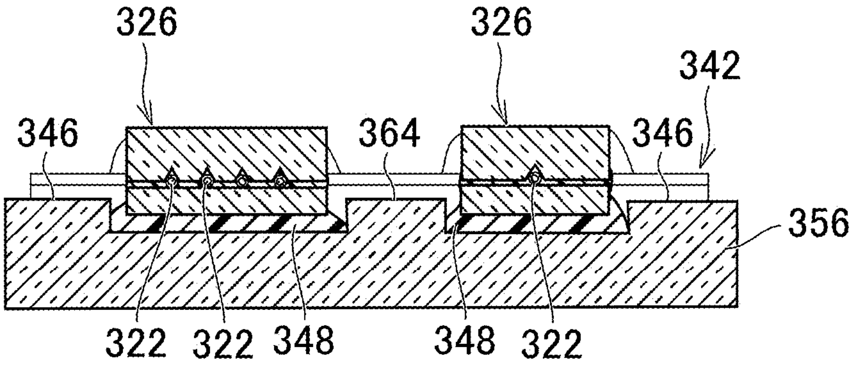
FIG. 14 is a cross-sectional view along line XIV-XIV of the internal structure in FIG. 13.

FIG. 13 is a partial plan view of an internal structure of an optical module according to a third embodiment. FIG. 14 is a cross-sectional view along line XIV-XIV of the internal structure in FIG. 13. The block 326 includes some blocks 326. The optical waveguide 344 embedded in the waveguide substrate 342 includes some optical waveguides 344. The optical fiber 322, to which each block 326 is attached, consists of one or more optical fibers 322.

The top face of the base substrate 356 includes a projection 364 between adjacent blocks 326, and a projection 346 outside all of the blocks 326. The adhesive 348 does not reach above the projections 346, 364. In other words, the projections 346, 364 can stop a lateral flow of the adhesive 348 before it cures, enabling more control over a shape of the adhesive 348. The blocks 326 may be bonded one by one. In that case, the projection 364 prevents the adhesive 348 used in previous bonding from flowing into an adjacent adhesion area, enabling a next proper bonding. If there are projections 346, 364 on both sides of each block 326, an amount of adhesive 348 can be properly managed by delineating it. The contents of the first embodiment are applicable to the other details.

Variant of Third Embodiment

Figure 15:
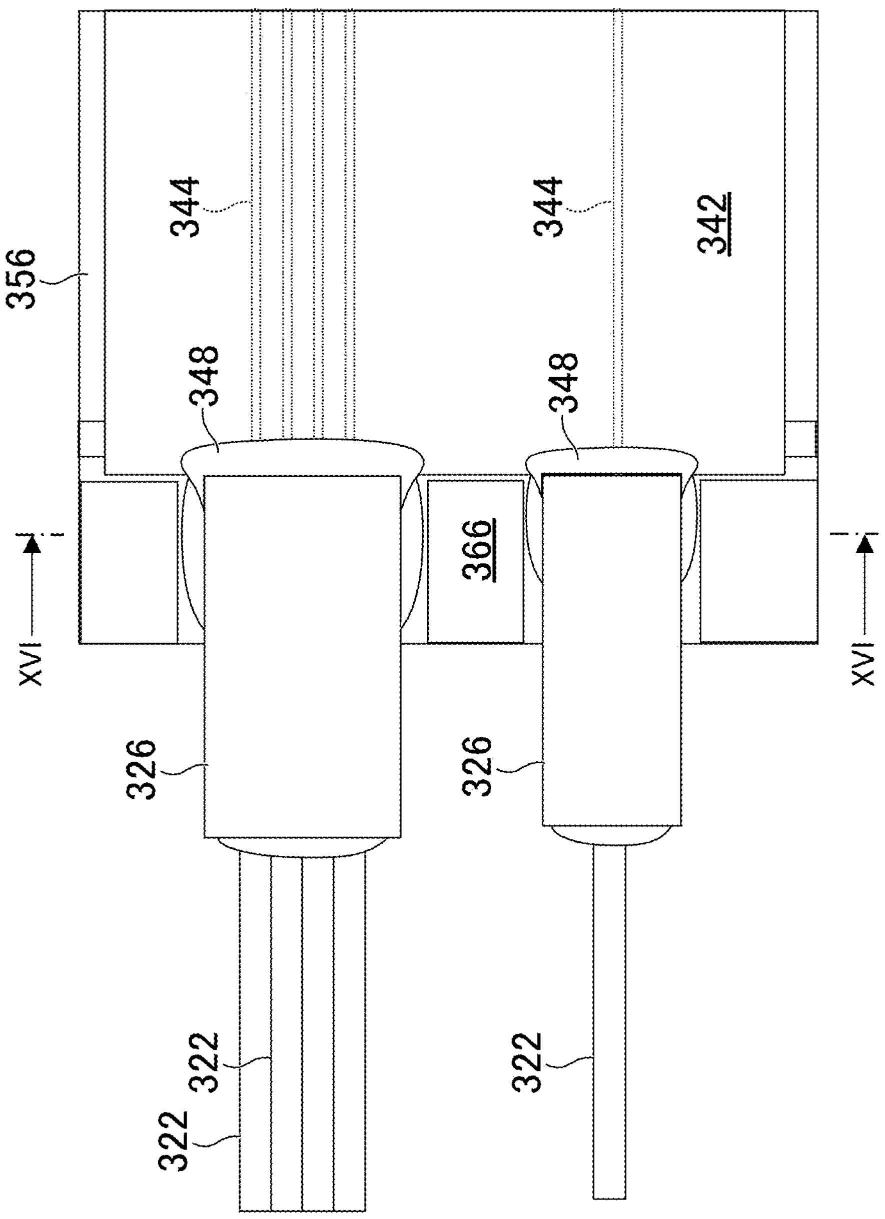
FIG. 15 is a partial plan view of an internal structure of an optical module according to a variant of the third embodiment.
Figure 16:
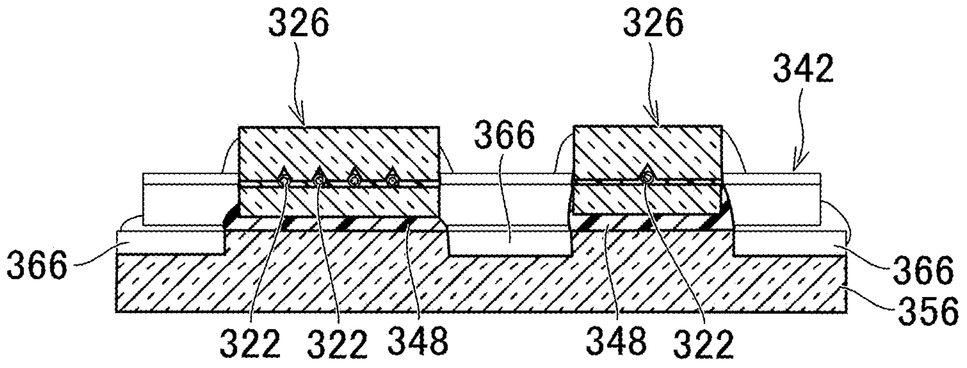
FIG. 16 is a cross-sectional view along line XVI-XVI of the internal structure in FIG. 15.

FIG. 15 is a partial plan view of an internal structure of an optical module according to a variant of the third embodiment. FIG. 16 is a cross-sectional view along line XVI-XVI of the internal structure in FIG. 15. The top face of the base substrate 356 includes recesses 366 on both sides of each block 326. The top face of the base substrate 356 includes edges adjacent to the recesses 366. Tips of the bottom surface of the adhesive 348 align with the edges. In other words, the recesses 366 stop the flow of the adhesive 348 before it cures. Bonding the blocks 326 can be performed one by one. In this case, the recesses 366 prevent the adhesive 348 used in the previous bonding from flowing into an adjacent bonding area, enabling a next appropriate bonding. If there are recesses 366 on both sides of each block 326, an amount of the adhesive 348 can be appropriately managed by delineating it.

Fourth Embodiment

Figure 17:
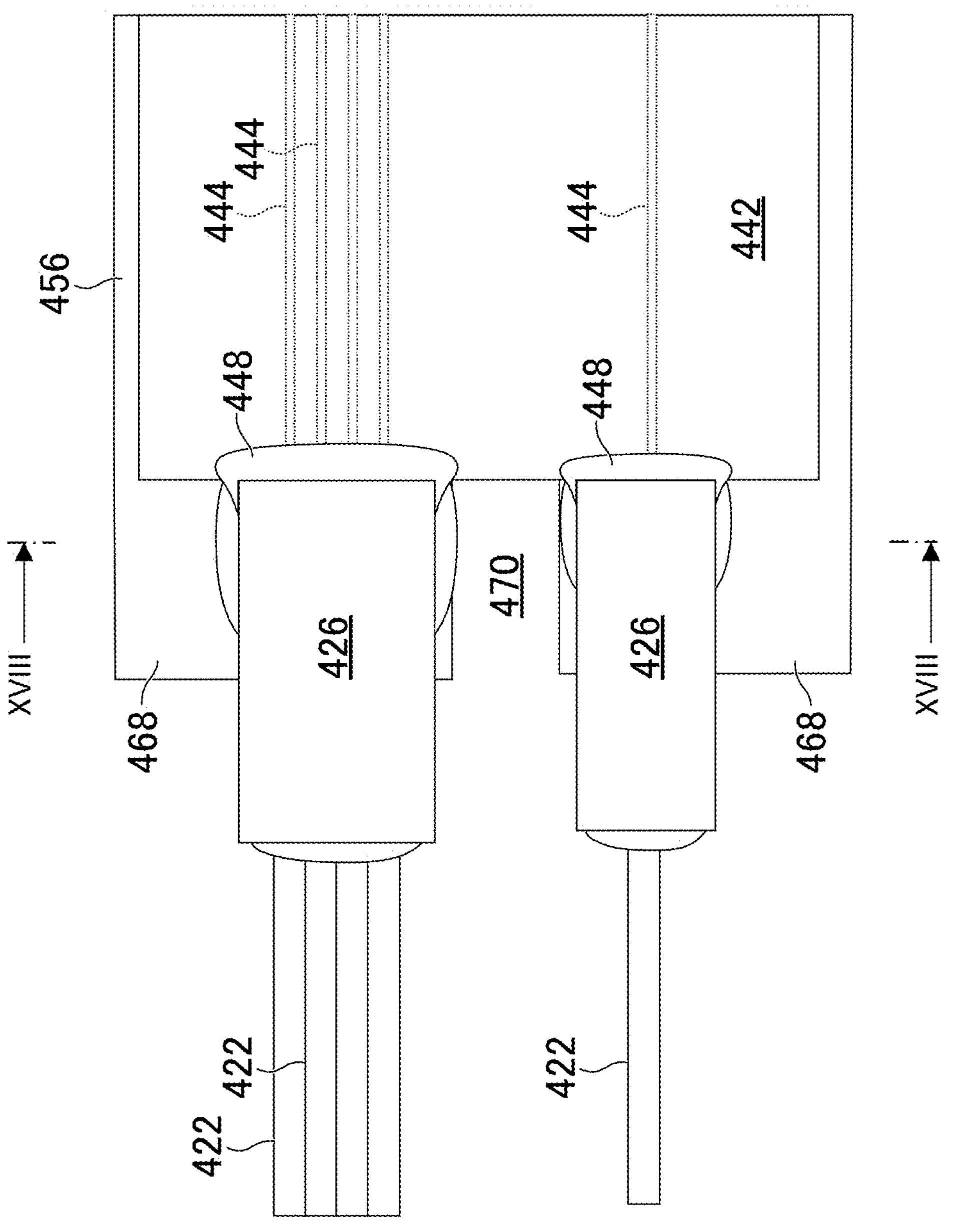
FIG. 17 is a partial plan view of an internal structure of an optical module according to a fourth embodiment.
Figure 18:
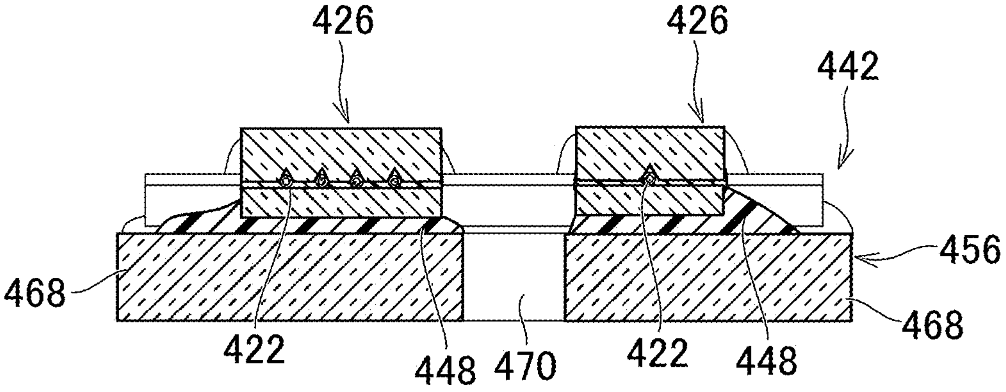
FIG. 18 is a cross-sectional view along line XVIII-XVIII of the internal structure in FIG. 17.

FIG. 17 is a partial plan view of an internal structure of an optical module according to a fourth embodiment. FIG. 18 is a cross-sectional view along line XVIII-XVIII of the internal structure in FIG. 17. The block 426 includes some blocks 426. The optical waveguide 444 embedded in the waveguide substrate 442 includes some optical waveguides 444. The optical fiber 422, to which each of the blocks 426 is attached, is one or more optical fibers 422. The base substrate 456 includes a main body to which the waveguide substrate 442 is fixed. The base substrate 456 includes some protrusions 468 protruding from the main body. The blocks 426 are bonded to the respective protrusions 468.

The base substrate 456 includes a cut-out 470 between adjacent protrusions 468. Without the cut-out 470, the planar shape of the base substrate 456 is rectangular. The top face of the base substrate 456 includes edges adjacent to the cut-out 470. Tips of the bottom surface of the adhesive 448 align with the edges. In other words, the cut-out 470 stops the flow of the adhesive 448 before it cures. As a result, an amount of the adhesive 448 can be appropriately managed by delineating it. Bonding the blocks 426 can be performed one by one. In this case, the cut-out 470 prevents the adhesive 448 used in the previous bonding from flowing into an adjacent bonding area, enabling a next appropriate bonding. For other details, the contents of the first embodiment are applicable.

Variant of Fourth Embodiment

Figure 19:
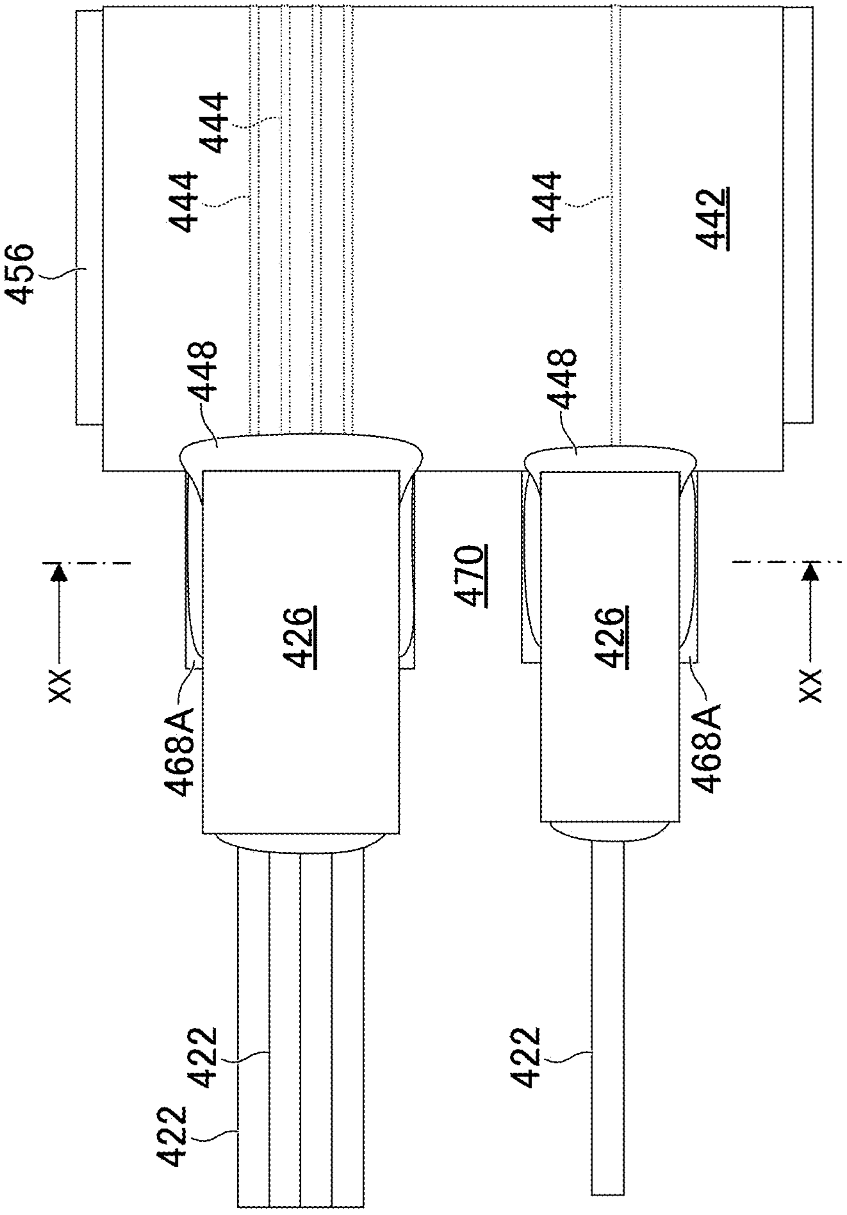
FIG. 19 is a partial plan view of an internal structure of an optical module according to a variant of the fourth embodiment.
Figure 20:
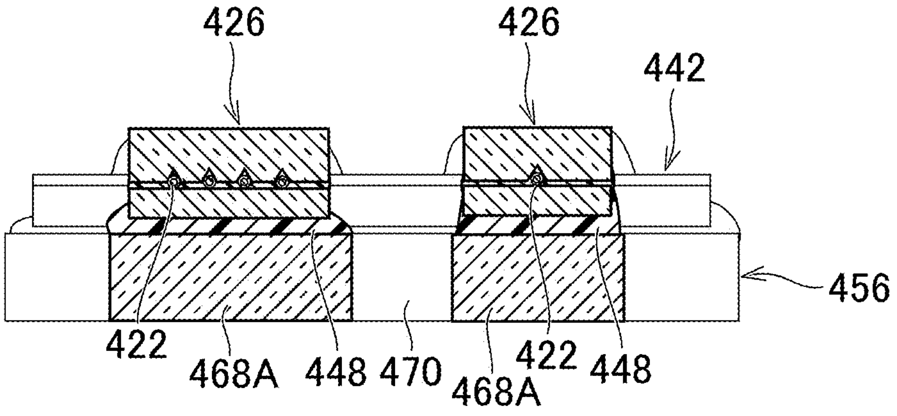
FIG. 20 is a cross-sectional view along line XX-XX of the internal structure in FIG. 19.

FIG. 19 is a partial plan view of an internal structure of an optical module according to a variant of the fourth embodiment. FIG. 20 is a cross-sectional view along line XX-XX of the internal structure in FIG. 19. Each block 426 is at a center of a corresponding one of the protrusions 468A in the direction where protrusions 468A are aligned. The protrusions 468A are narrower in width than the protrusion 468 shown in FIG. 18. Therefore, the tips of the bottom surface of the adhesive 448 align with the edges on both sides of each protrusion 468A. As a result, the amount of the adhesive 448 can be further appropriately managed.

The embodiments described above are not restrictive, and various modifications are possible. The structures explained in the embodiments may be replaced with structures that are substantially similar or others that can achieve the same effect or purpose.

Outline of Embodiments (1) An optical module including: a block 26 attached to an end part of an optical fiber 22, the block 26 including a front face 28 from which a tip face of the optical fiber 22 is exposed; a waveguide substrate 42 in which an optical waveguide 44 is embedded, the waveguide substrate 42 including a side face 46 from which a tip face of the optical waveguide 44 is exposed, the side face 46 facing the front face 28 of the block 26, a top part of the front face 28 protruding upward from the side face 46, the optical fiber 22 and the optical waveguide 44 aligning on a coinciding optical axis; a base substrate 56 including a top face to which a bottom face of the waveguide substrate 42 is fixed, the base substrate 56 including a sticking-out part protruding under the block 26 from the waveguide substrate 42, the top face facing the bottom face of the block 26; and an adhesive 48 bonding the block 26 to the waveguide substrate 42 and the base substrate 56, the adhesive 48 including a top segment 52 located at a corner section delineated by the top part of the front face 28 of the block 26 and a top face of the waveguide substrate 42, the adhesive 48 including a middle segment 50 interposed between the front face 28 of the block 26 and the side face 46 of the waveguide substrate 42, the adhesive 48 including a bottom segment 54 interposed between the bottom face of the block 26 and a top face of the base substrate 56.

Expansion of the top segment 52 of the adhesive 48 applies a force that causes the block 26 to tilt, but expansion of the bottom segment 54 applies a force to the block 26 in an opposite direction. This prevents a tilt of the block 26, stabilizing the optical coupling between the optical fiber 22 and the optical waveguide 44.

(2) The optical module according to (1), wherein a spacing between the bottom face of the block 26 and the top face of the base substrate 56 is greater than a spacing between the bottom face of the waveguide substrate 42 and the top face of the base substrate 56.

(3) The optical module according to (2), wherein the bottom face of the block 26 is positioned higher than the bottom face of the waveguide substrate 42.

(4) The optical module according to (3), wherein the top face of the base substrate 56 is flat under the block 26 and the waveguide substrate 42.

(5) The optical module according to (2), wherein the bottom face of the block 226 is positioned lower than the bottom face of the waveguide substrate 242.

(6) The optical module according to (5), wherein the top face of the base substrate 256 is lower under the block 226 than under the waveguide substrate 242.

(7) The optical module according to any one of (1) to (6), further including an adhesive layer 58 interposed between the waveguide substrate 42 and the base substrate 56, the top face of the base substrate 56 including a groove 62A, an end part of the adhesive layer 58 being positioned inside the groove 62A.

(8) The optical module according to (7), wherein the groove 62A extends along a bottom edge of the side face 46 of the waveguide substrate 42.

(9) The optical module according to (8), wherein the groove 62A faces the bottom face of the waveguide substrate 42.

(10) The optical module according to (8), wherein the groove 62B faces the bottom face of the block 26.

(11) The optical module according to (8), wherein the groove 62C is directly below the side face 46 of the waveguide substrate 42.

(12) The optical module according to any one of (1) to (11), wherein the block 326 includes some blocks 326, the optical waveguide 344 embedded in the waveguide substrate 342 includes some optical waveguides 344, and the optical fiber 322 to which each of the blocks 326 is attached is one or more optical fibers 322.

(13) The optical module according to (12), wherein the top face of the base substrate 356 includes a projection 364 between an adjacent pair of the blocks 326.

(14) The optical module according to (13), wherein the adhesive 348 does not reach up to the projection 364.

(15) The optical module according to (12), wherein the top face of the base substrate 356 includes a recess 366 between an adjacent pair of the blocks 326.

(16) The optical module according to (15), wherein the top face of the base substrate 356 includes an edge adjacent to the recess 366, and a tip of a bottom face of the adhesive 348 aligns with the edge.

(17) The optical module according to (12), wherein the base substrate 456 includes a main body to which the waveguide substrate 442 is fixed, the base substrate 456 includes some protrusions 468 protruding from the main body, the base substrate 456 includes a cut-out 470 between an adjacent pair of the protrusions 468, and the blocks 426 are bonded to the respective protrusions 468.

(18) The optical module according to (17), wherein the top face of the base substrate 456 includes an edge adjacent to the cut-out 470, and a tip of a bottom face of the adhesive 448 aligns with the edge.

(19) The optical module according to (17) or (18), wherein each of the blocks 426 is at a center of a corresponding one of the protrusions 468A in a direction in which the protrusions 468A line up.

(20) The optical module according to any one of (1) to (19), wherein the block 26 includes a lower substrate 30 bonded to the base substrate 56 and an upper substrate 34 on the lower substrate 30, the optical fiber 22 is sandwiched between the lower substrate 30 and the upper substrate 34, and the lower substrate 30 is thinner than the upper substrate 34.

(21) The optical module according to (20), wherein the upper substrate 34 includes a V-groove 36, located on a surface facing the lower substrate 30, in which the optical fiber 22 is placed.

(22) The optical module according to (20) or (21), wherein the lower substrate 30 is shorter, in length from the front face 28 of the block 26, than the upper substrate 34.

(23) The optical module according to (22), further including a bonding material 40 that bonds the upper substrate 34 and the lower substrate 30, the upper substrate 34 including a sticking-out undersurface 38 protruding from the lower substrate 30, the lower substrate 30 including a rear end face 32 opposite to the front face 28, part of the bonding material 40 being located at a corner section delineated by the sticking-out undersurface 38 and the rear end face 32.

(24) The optical module according to (23), wherein the base substrate 56 is of a length that prevents overlap with the part of the bonding material 40.

(25) The optical module according to any one of (1) to (24), wherein the block 26 is made of a light transmissive material, and the adhesive 48 is a light-curable adhesive 48.

(26) The optical module according to any one of (1) to (25), wherein the adhesive 48 is greater in thermal expansion coefficient than the base substrate 56.

What is claimed is:

1. An optical module comprising:

a block attached to an end part of an optical fiber, the block including a front face from which a tip face of the optical fiber is exposed;

a waveguide substrate in which an optical waveguide is embedded, the waveguide substrate including a side face from which a tip face of the optical waveguide is exposed, the side face facing the front face of the block, a top part of the front face protruding upward from the side face, the optical fiber and the optical waveguide aligning on a coinciding optical axis;

a base substrate including a top face to which a bottom face of the waveguide substrate is fixed, the base substrate including a sticking-out part protruding under the block from the waveguide substrate, the top face facing the bottom face of the block; and an adhesive bonding the block to the waveguide substrate and the base substrate, the adhesive including a top segment located at a corner section delineated by the top part of the front face of the block and a top face of the waveguide substrate, the adhesive including a middle segment interposed between the front face of the block and the side face of the waveguide substrate, the adhesive including a bottom segment interposed between the bottom face of the block and a top face of the base substrate.

2. The optical module according to claim 1, wherein a spacing between the bottom face of the block and the top face of the base substrate is greater than a spacing between the bottom face of the waveguide substrate and the top face of the base substrate.

3. The optical module according to claim 2, wherein the bottom face of the block is positioned higher than the bottom face of the waveguide substrate.

4. The optical module according to claim 3, wherein the top face of the base substrate is flat under the block and the waveguide substrate.

5. The optical module according to claim 2, wherein the bottom face of the block is positioned lower than the bottom face of the waveguide substrate.

6. The optical module according to claim 5, wherein the top face of the base substrate is lower under the block than under the waveguide substrate.

7. The optical module according to claim 1, further comprising an adhesive layer interposed between the waveguide substrate and the base substrate, the top face of the base substrate including a groove, an end part of the adhesive layer being positioned inside the groove.

8. The optical module according to claim 7, wherein the groove extends along a bottom edge of the side face of the waveguide substrate.

9. The optical module according to claim 8, wherein the groove faces the bottom face of the waveguide substrate.

10. The optical module according to claim 8, wherein the groove faces the bottom face of the block.

11. The optical module according to claim 8, wherein the groove is directly below the side face of the waveguide substrate.

12. The optical module according to claim 1, wherein the block includes some blocks, the optical waveguide embedded in the waveguide substrate includes some optical waveguides, and the optical fiber to which each of the blocks is attached is one or more optical fibers.

13. The optical module according to claim 12, wherein the top face of the base substrate includes a projection between an adjacent pair of the blocks.

14. The optical module according to claim 13, wherein the adhesive does not reach up to the projection.

15. The optical module according to claim 12, wherein the top face of the base substrate includes a recess between an adjacent pair of the blocks.

16. The optical module according to claim 15, wherein the top face of the base substrate includes an edge adjacent to the recess, and a tip of a bottom face of the adhesive aligns with the edge.

17. The optical module according to claim 12, wherein the base substrate includes a main body to which the waveguide substrate is fixed, the base substrate includes some protrusions protruding from the main body, the base substrate includes a cut-out between an adjacent pair of the protrusions, and the blocks are bonded to the respective protrusions.

18. The optical module according to claim 17, wherein the top face of the base substrate includes an edge adjacent to the cut-out, and a tip of a bottom face of the adhesive aligns with the edge.

19. The optical module according to claim 17, wherein each of the blocks is at a center of a corresponding one of the protrusions in a direction in which the protrusions line up.

20. The optical module according to claim 1, wherein the block includes a lower substrate bonded to the base substrate and an upper substrate on the lower substrate, the optical fiber is sandwiched between the lower substrate and the upper substrate, and the lower substrate is thinner than the upper substrate.

21. The optical module according to claim 20, wherein the upper substrate includes a V-groove, located on a surface facing the lower substrate, in which the optical fiber is placed.

22. The optical module according to claim 20, wherein the lower substrate is shorter, in length from the front face of the block, than the upper substrate.

23. The optical module according to claim 22, further comprising a bonding material that bonds the upper substrate and the lower substrate, the upper substrate including a sticking-out undersurface protruding from the lower substrate, the lower substrate including a rear end face opposite to the front face, part of the bonding material being located at a corner section delineated by the sticking-out undersurface and the rear end face.

24. The optical module according to claim 23, wherein the base substrate is of a length that prevents overlap with the part of the bonding material.

25. The optical module according to claim 1, wherein the block is made of a light transmissive material, and the adhesive is a light-curable adhesive.

26. The optical module according to claim 1, wherein the adhesive is greater in thermal expansion coefficient than the base substrate.

* * * * *